Feb. 23, 1960          O. J. WINKELMANN          2,925,741

ELECTROMAGNETIC POWER STEERING MECHANISM

Filed Sept. 2, 1955                                         5 Sheets-Sheet 1

INVENTOR.
Otto J. Winkelmann.
BY
Harness and Harris
ATTORNEYS.

United States Patent Office 2,925,741
Patented Feb. 23, 1960

2,925,741

ELECTROMAGNETIC POWER STEERING MECHANISM

Otto J. Winkelmann, Birmingham, Mich., assignor to Chrysler Corporation, Highland Park, Mich., a corporation of Delaware Application September 2, 1955, Serial No. 532,249

11 Claims. (Cl. 74—388)

My invention relates generally to power boosting mechanisms and more particularly to power steering mechanisms for automotive vehicles or the like.

I am aware of various forms of power steering mechanisms which, like the mechanism of my instant invention, comprise a mechanical connection between a manually operable steering member and the dirigible wheels of the vehicle and in which hydraulic pressure responsive means are provided for transferring a portion of the vehicle engine power to the steering linkage mechanism to supplement the manually applied steering effort. However, my improved power steering mechanism is unique in that power may be transferred from the vehicle engine to the driven portions of the steering mechanism through a novel mechanical transmission having an engine driven power input member and having two power delivery paths for accommodating the transmission of auxiliary steering torque from the engine driven member to the driven portions, each of said paths including a novel clutching mechanism to effect a smooth and readily controllable driving connection between the vehicle engine and the steering mechanism.

The provision of an improved power steering mechanism of the type mentioned above being a principal object of my invention, a further object of my invention is to provide a means for eliminating backlash in the geared connection between the driven portions of the power transmitting mechanism and the manually operable portions of the steering mechanism.

It is a further object of my present invention to provide a power steering mechanism having a power transmission means for delivering vehicle engine power to the driven portions of the steering mechanism wherein a one-way clutch means is strategically located in the power delivery path to accommodate the transfer of power to the manually operable portions of the steering mechanism and to prevent the transfer of power in the reverse direction.

It is a further object of my invention to provide a steering mechanism of the type previously described wherein engine power may be delivered to the manually operable portions of the steering mechanism through two distinct power delivery paths, each of said paths having a portion thereof clutched to an engine powered driving member by means of an electromagnetic clutch element.

Another object of my invention is to provide a steering mechanism as set forth in the preceding object wherein the manually operable portion of the mechanism includes a steering member and a steering shaft extending from the steering member to the driven portions of the mechanism and wherein variable resistance means are provided for connecting the steering member with the steering shaft, said variable resistance means forming a portion of the energizing circuit for the electromagnetic clutches.

It is a further object of my invention to provide a power steering mechanism as set forth in the preceding objects wherein the resistance in the electrical circuit for each of the electromagnetic clutches may be varied in proportion to the magnitude of the applied steering effort, the magnitude of the power assist from the vehicle engine thereby being proportional to the vehicle steering requirements.

A further object of my invention is to provide a power steering mechanism which is characterized by improved operating characteristics and which is capable of providing a smooth transfer of power from the power source to the manually operable portions of the mechanism.

Other objects and features of my invention will readily become apparent from the following description and from the accompanying drawings wherein:

Figure 6 is a detail cross sectional view of the connection between the steering wheel and the steering shaft and is taken along section line 6—6 of Figure 3;

Figure 1:
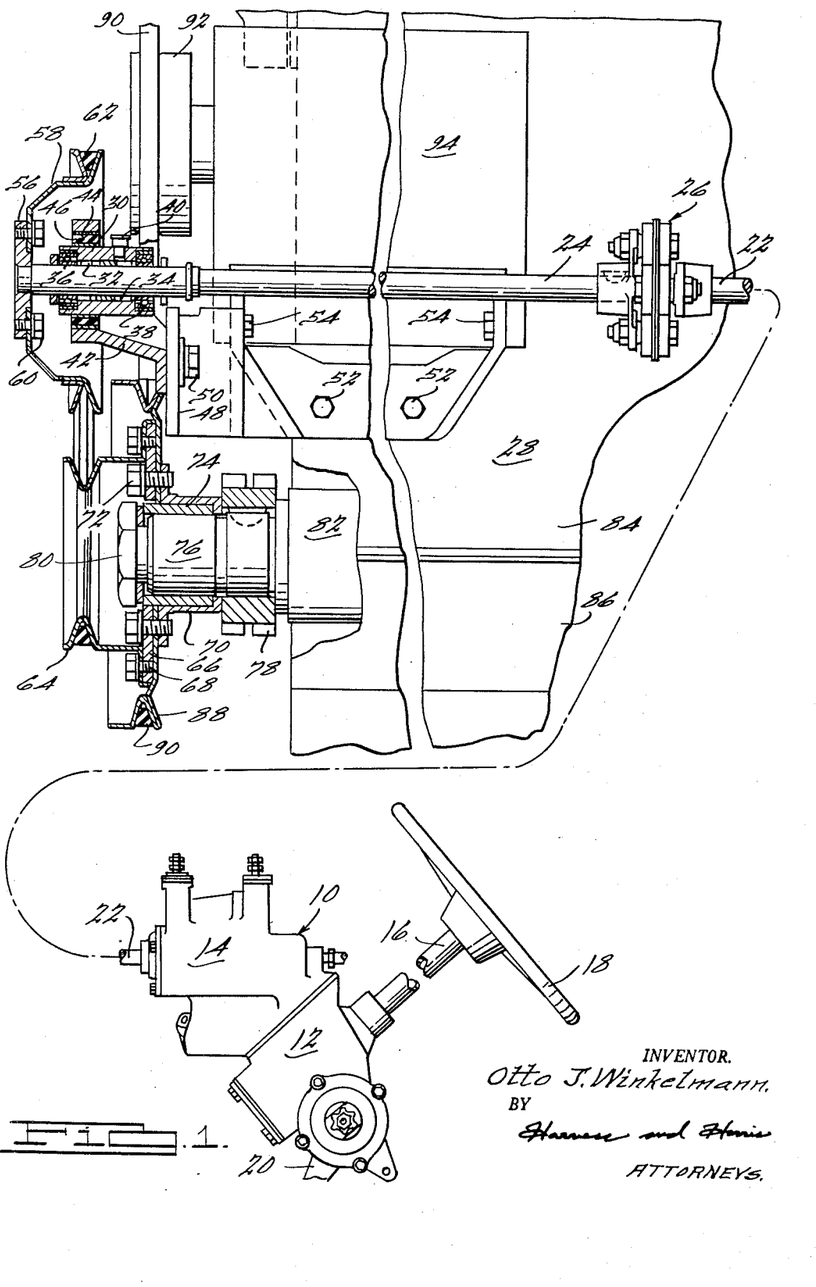
Figure 1 is a partly schematic view showing the outline of the steering mechanism of my instant invention and a portion of the transmission means for delivering power from the vehicle engine to the steering mechanism to effect a power assist.

Referring first to Figure 1, I have schematically illustrated the power steering mechanism of my instant invention by numeral 10 and it includes a gear reduction casing 12 and a power transmission casing 14, the former having a steering shaft 16 extending in a generally upward direction with a steering wheel 18 secured at the upper end thereof. The steering mechanism 10 may be mounted within the engine compartment of a wheeled vehicle and the steering wheel 18 may be positioned within the vehicle passenger compartment in a conventional manner. The mechanism 10 includes a pitman arm 20 capable of being oscillated about the axis of a rocker shaft upon movemnet of steering wheel 18, said pitman arm forming a portion of the vehicle steering linkage mechanism.

The transmission housing 14 of the steering mechanism 10 is provided with a power input shaft 22 which may be drivably coupled to a pulley driven shaft 24 by a universal coupling 26 of known construction, said shafts 22 and 24 being axially aligned on one side of the vehicle engine 28. The extended end of the shaft 24 may be rotatably journalled within a bearing housing 30 within which spaced needle bearings 32 and 34 are positioned. Oil seals 36 and 38 are positioned on either side of the bearing housing 30 and lubricating oil may be applied to the bearings 32 and 34 through a suitable fitting 40. The bearing housing 30 may be supported by a bracket 42 within which is formed an opening 44. A resilient bushing 46 is received within the opening 44 about the bearing housing 30 for resiliently supporting the latter. The bracket 42 may be bolted to a flanged portion of another bracket 48, suitable bolts 50 being provided for this purpose. The bracket 48 may in turn be bolted to a side of the engine 28 by suitable bolts 52 and 54.

The end of the shaft 24 may be fixed to the hub 56 of a first drive pulley 58, said pulley 58 including a disc portion bolted to the hub 56 by bolts 60. The periphery of the pulley 58 is formed with a V groove for accommodating a V belt 62, said belt extending about a crankshaft driven pulley 64 as shown. The pulley 64 also includes a V-shaped periphery for accommodating the V belt 62 and it is bolted to a drive disc 66 by means of bolts 68. The drive disc 66 may be bolted to an adaptor 70 by bolts 72 and the adaptor 70 may be drivably carried by a sleeve 74 positioned about an extended end 76 of the engine crankshaft. The adaptor 70 is positioned adjacent the engine timing gear 78 as indicated in Figure 1, and the pulley 64 and timing gear 78 are retained on the crankshaft end 76 by a threaded clamping member 80. The engine crankshaft may be journalled in a bearing housing schematically shown at 82, said bearing housing being retained between the vehicle engine block 84 and an engine oil pan structure 86.

Another pulley may be carried by the engine crankshaft as indicated at 88, and it includes a hub disc portion secured to the disc 66 by the bolts 72. A V belt 90 may be trained over the pulley 88 and over the generator drive pulley 92, the latter being connected to the armature of the engine generator shown in outline in Figure 1 and designated by numeral 94.

The steering mechanism 10 may be supported by the vehicle chassis structure in a conventional manner and the universal coupling 26 is adapted to accommodate relative vertical or transverse displacement between the engine driven shaft 24 and the power input shaft 22. Displacement of the engine in a fore and aft or axial direction may be accommodated by the needle bearings 32 and 34, said bearings being capable of sliding on the shaft 24 in either axial direction during operation.

Figure 2:
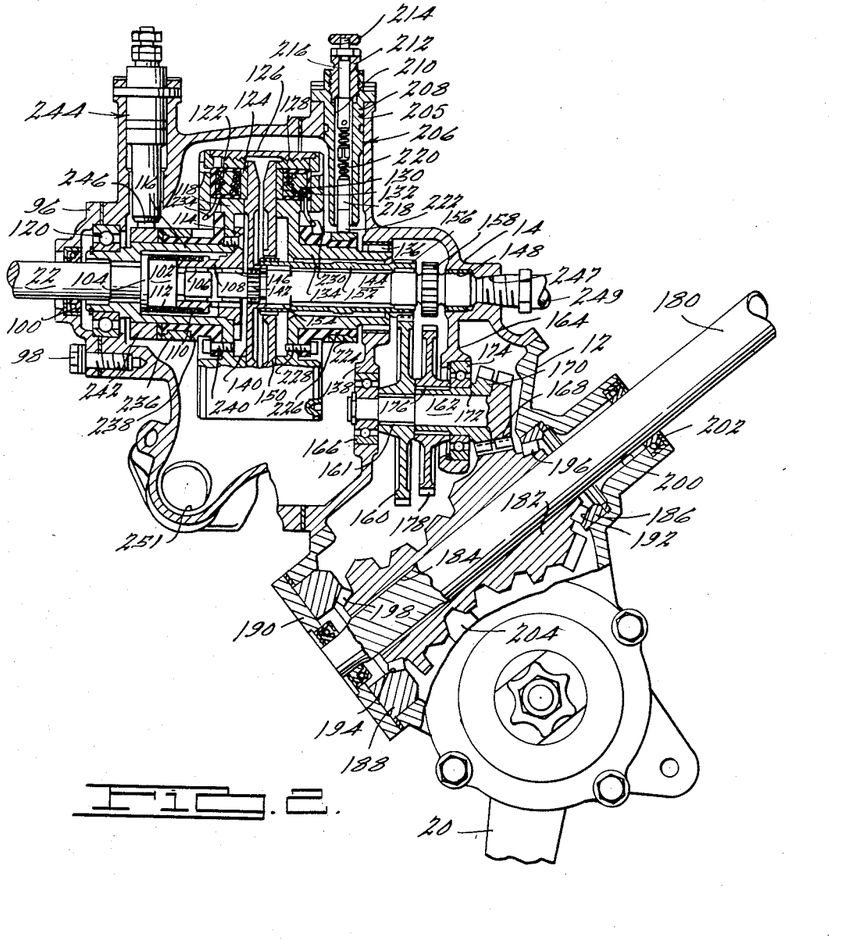
Figure 2 is a cross sectional assembly view showing other components of the power transmission means for delivering engine power to the manually operable portion of the steering mechanism.

Referring next to Figure 2, the structure of the steering mechanism 10 is shown in more particular detail. It may be seen that the power transmission housing portion 14 is secured to the gear reduction housing portion 12 to form a unitary assembly. The power input shaft 22 extends through an end closure member 96 secured to one side of the housing 14 by bolts 98. A fluid seal 100 is positioned within the closure member 96 to prevent leakage of fluid around the power output shaft 22. The shaft 22 includes a cylindrical section 102 having a flanged edge 104 at one side thereof. The shaft 22 is reduced in diameter at the other side of the cylindrical section 102 and it is journalled within a bushing 106, said bushing being received within a central opening formed in a substantially cylindrical adaptor 108. A cylindrical surface 110 is formed on the adaptor 108 adjacent the cylindrical section 102 of the power input shaft 22, the diameter of the cylindrical surface 110 being substantially the same as that of the cylindrical section 102. A clutch spring 112 may encircle the adjacent cylindrical surface of the shaft section 102 and the adaptor 108 to provide a one-way clutch between the shaft 22 and the adaptor 108, said spring being capable of frictionally engaging the associated cylindrical surfaces for transmitting torque between the shaft 22 and the adaptor 108 in one direction only.

The adaptor 108 also includes a radial flange 114 which may be secured to the hub 116 of a first electromagnetic clutch member 118. The hub 116 forms an axially extending sleeve and is journalled at its extended end in the housing portion 14 by a suitable bearing 120.

The electromagnetic clutch member 118 comprises a wound wire core 122 which encircles the axis of the shaft 22 and a friction disc 124 is positioned adjacent the core 122 as indicated. The periphery of the clutch element 118 is threadably received within the cylindrical shell 126 and a second electromagnetic clutch member 128 is also threadably received within the shell 126 in juxtaposition with respect to the clutch member 118. The clutch member 128 includes a wound wire core 130 which also encircles the axis of shaft 22 and a friction disc 132 is positioned adjacent core 130 with one surface thereof being exposed as indicated. The clutch member 128 is provided with an elongated axially extending hub 134 which may be journalled at the extended end thereof within the housing portion 14 by suitable needle bearings 136, said housing 14 including a partition 138 within which the hub 134 is journalled.

A first clutch armature member 140 is formed as indicated with a substantially disc-like shape with the periphery thereof disposed adjacent the friction disc 124. The hub of the clutch armature 140 is securely splined at 142 to a shaft 144 situated in axial alignment with respect to the shaft 22. One end of the shaft 144 may be journalled within the central opening of the adaptor 108 by needle bearings 146 and the other end of the shaft 144 may be journalled in the end wall of the housing portion 14 by needle bearings 148.

Similarly, a second disc-like clutch armature member 150 may be positioned as shown, with the periphery thereof adjacent the friction disc 132 and with the central hub securely splined to sleeve shaft 152, said sleeve shaft being journalled at spaced locations on the shaft 144 by bushings 154 and 156. A driving pinion 156 may be formed on the end of the sleeve shaft 152 and another driving pinion 158 may be formed on the shaft 144 in adjacent relationship with respect to the pinion 156. A relatively large diameter driven gear 160 drivably engages the pinion 156 and the central hub thereof is splined at 161 to one end of the shaft 162, said shaft being rotatably journalled at spaced locations by the housing partition 138 and by a web 164 formed integrally with the housing portion 14 in the interior thereof. A first bearing 166 is positioned in the partition 138 for supporting one end of the shaft 162 and the other end of the shaft 162 carries a beveled pinion gear 168 as indicated. A second beveled pinion gear 170 is positioned adjacent pinion gear 168 and is formed with an elongated hub 172 encircling the shaft 162. The hub 172 of the pinion gear 170 is journalled in the housing web 164 by a suitable bearing 174 and is splined at 176 to the hub of a second large diameter gear 178, the latter being positioned adjacent gear 160 in concentric relationship therewith. The gear 178 may be drivably connected to the pinion 158 through an intermediate idler gear, not shown, said idler gear being mounted in a fixed position within the housing 14 so as to engage the pinion 158 and the gear 178.

A steering shaft 180 extends through the housing portion 12 and a worm gear 182 is splined at 184 to the shaft 180 as indicated. A circular roller bearing race is positioned within the housing portion 12 about the shaft 180 as indicated at 186 and at 188, the latter being retained in place partly by means of an end closure plate 190 secured to the housing portion 12. The bearing races 186 and 188 may be formed with tapered bearing surfaces 192 and 194 respectively, and the ends of the worm gear 182 may similarly be tapered as indicated. A plurality of roller bearing elements 196 and 198 may be interposed between the ends of the worm gear 182 and the races 186 and 188 respectively. The shaft 180 may extend in a generally upward direction through an opening 200 within which an oil seal 202 may be situated.

A rocker shaft not shown may be rotatably mounted within the lower section of housing portion 12 and it may extend in a generally transverse direction with respect to the axis of the shaft 180. A sector gear shown in part at 204 may be drivably carried by the rocker shaft and it may be drivably engaged by the worm gear 182. The pitman arm 20 is secured to the rocker shaft as previously described.

The housing portion 14 may be formed with a first opening 205 for receiving a brush member generally indicated at 206, said brush comprising an elongated body member 208 threadably received within the opening 205, said body member including an axially extending opening 210 lined with a suitable electrical insulating material. An insulated terminal 212 may be threadably received within the end of the body member 208 at one end of the central opening 210, and means may be provided at 214 for facilitating a connection with an electrical lead. A conductor 216 may extend from a terminal portion 214 to the interior of the body portion 208 and a second conductor 218 may be positioned within the opening 210 as indicated, said conductors 216 and 217 being biased away from each other by a spring 220. A carbon brush 222 may be urged by the conductor 218 into engagement with a slip ring 224 carried by an insulated sleeve 226, the latter being positioned about the hub 134 of the clutch member 128 and secured to the clutch member 128 by bolts 228. One end 230 of the wound wire core 130 may be connected to the slip ring 224 in a conventional manner, and the other end of the core 130 may be grounded through the body of the clutch member 128 and the cylindrical shell 126.

One end 234 of the wound wire core 122 may be connected to another slip ring 236 disposed about the axis of the shaft 22 and insulated from the metallic components of the mechanism by an insulator sleeve 238, said insulator sleeve being bolted to the clutch member 118 by bolts 240. Another spring loaded brush assembly may be formed in the housing portion 14 in a manner similar to that of the brush assembly 206 previously described although it does not appear in Figure 2 since it is out of the plane of the section. The other end of the wound wire core 122 may be grounded through the clutch member 118 and the hub extension 116, the latter having formed thereon a third slip ring 242. Another brush assembly may be formed in the housing portion 14 as indicated at 244, said brush assembly 244 including a carbon element 246 which slidably contacts the slip ring 242 to provide a ground circuit for each of the electromagnetic clutch cores 122 and 130. The brush assembly 244 may be similar to the brush assembly 206 previously described. The housing portion 14 is provided with a fluid intake opening 247 within which is received a fluid fitting 249 for permitting the entry of lubricating oil into the power transmission mechanism. The underside of the housing portion 14 may be formed with a fluid outlet opening 251 through which the lubricating oil may be drained.

Figure 5:
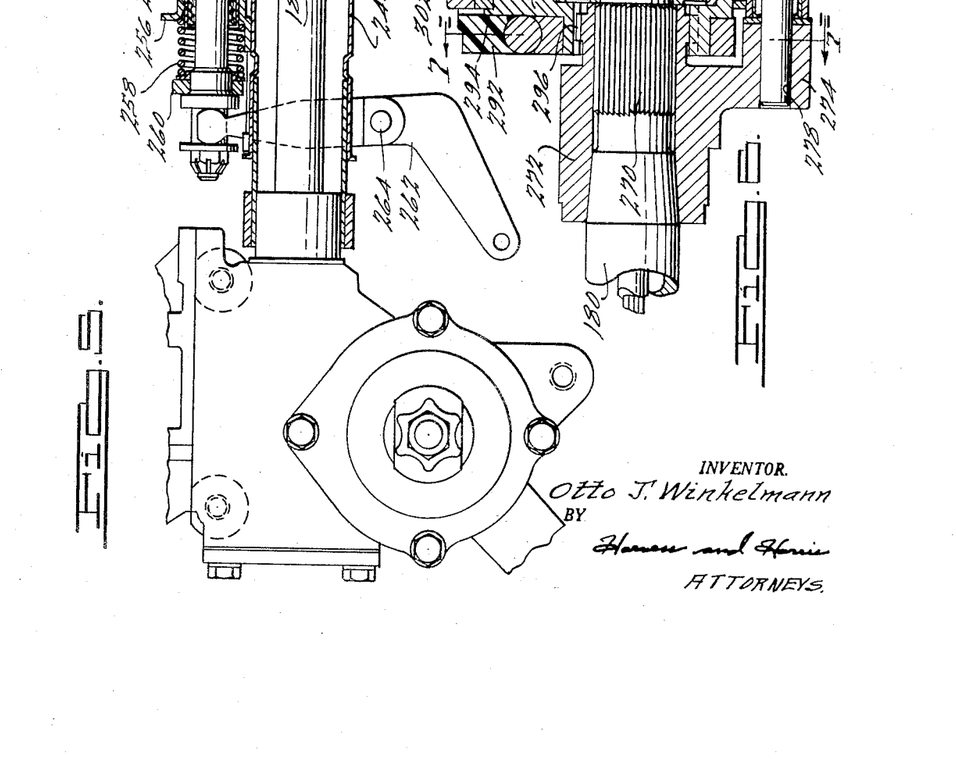
Figure 5 is a view partly in cross section of the steering wheel assembly and the steering shaft and is taken along section line 5—5 of Figure 3.

Referring next to Figure 5, it may be seen that the steering shaft 180 extends in concentric relationship with respect to a hollow stationary steering post 248, the latter including a flanged portion 250 carried at the upper end thereof. A portion of the gear shift mechanism may be seen in Figure 5 and it comprises a shifting shaft 252 which may be secured at the lower end of the steering post 248 by a bushing 254 carried by a supporting bracket 256. The shifting shaft 252 may be urged in a downward direction along the axis of the shaft 180 by a spring 258 interposed between the bracket 256 and a spring backup member 260 carried by the end of the shaft 252. The shaft 252 is adapted to engage the end of a bellcrank lever 262 which may be pivoted to the spring post 248 at 264, said bellcrank forming a portion of the gear shift linkage mechanism. The upper end of the gear shifting shaft 252 may carry an indicator pointer 266 and the angular position of the pointer 266 may be indicated by suitable markings formed on a stationary plate 268.

The upper end of the steering shaft 180 may be splined as shown at 270, to an internally splined hollow adaptor 272 having a radial extension 274 formed thereon. A supporting pin 276 is fixed within a longitudinal opening 278 in the extension 274, said pin being adapted to rotatably support a roller 280 by means of needle bearings 282.

A steering wheel bearing housing 284 encircles the axis of the shaft 180 and is formed with a central opening for receiving a pair of bearings 286 and 288 which rotatably support the housing 284 on the upper end of shaft 180. A steering wheel 18 includes spokes 290 which are joined to a steering wheel hub 292, the latter being suitably secured to one side 294 of the steering wheel bearing housing 284.

One side of the adaptor 272 is externally splined at 296 and is received within an internally splined section of the bearing housing 284, the teeth of the mating internal and external splines being capable of accommodating a considerable degree of relative rotary motion of the housing 284 and the adaptor 272. The tooth width of the externally splined teeth at 296 may be substantially less than the tooth space of the mating external spline teeth thus permitting this relative movement.

Figures 3, 4:
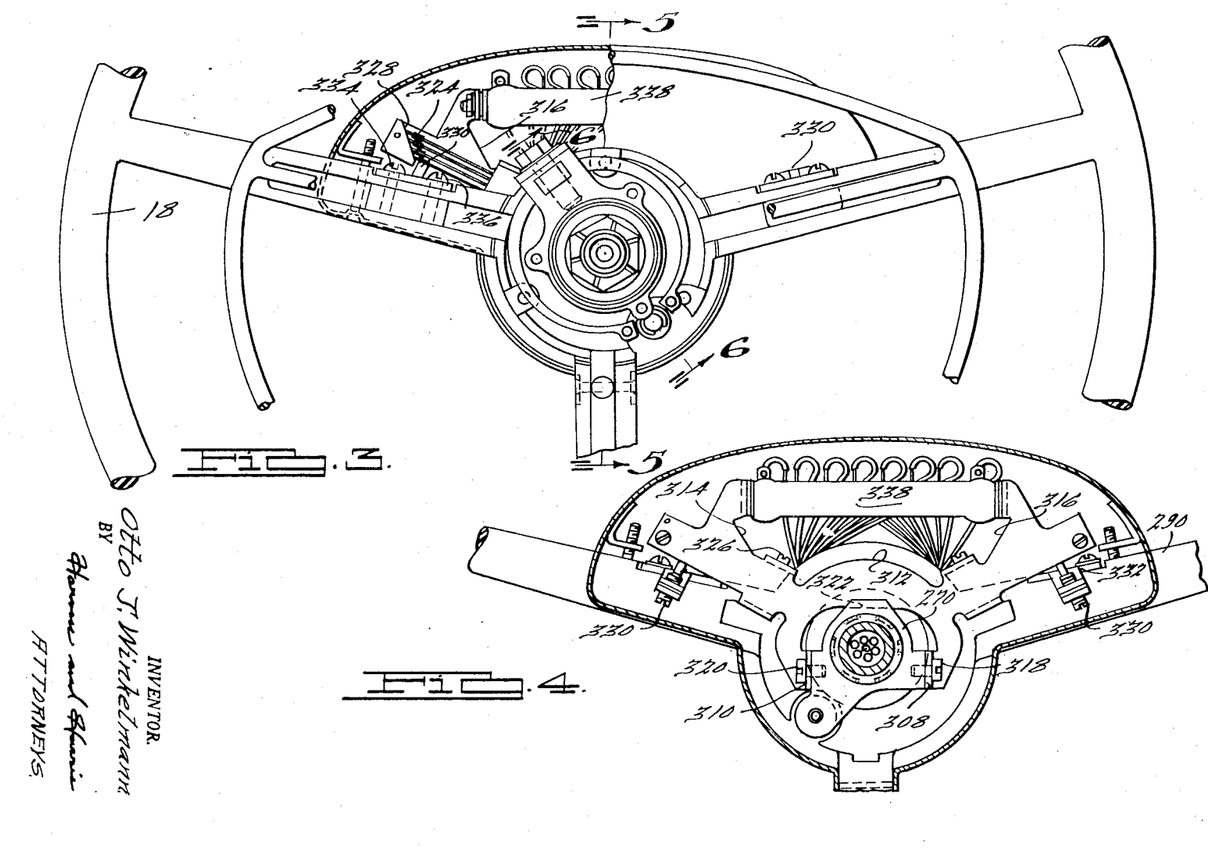
Figure 3 is a top plan view of the steering wheel assembly situated within the passenger compartment of the vehicle showing a portion of the switching mechanism for controlling the electromagnetic clutches of the power transmission mechanism.
Figure 4 is a bottom plan view of the steering wheel and switch mechanism shown in Figure 3.
Figure 4:
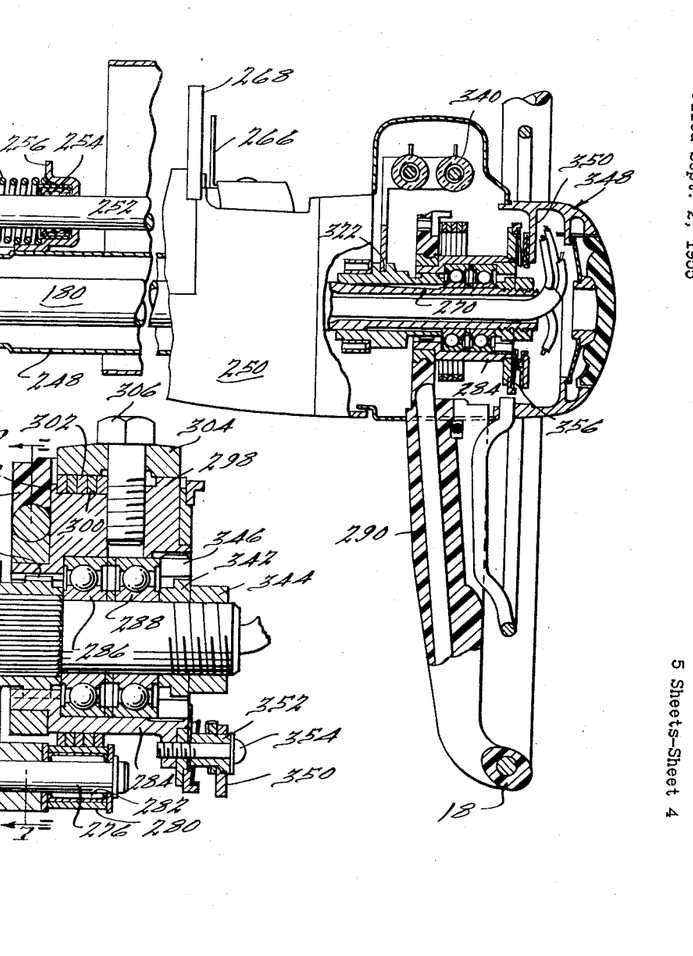

The bearing housing 284 is formed with a radially extending boss 298 which may be formed with a recess at 300 to receive therein a plurality of circular springs 302, said springs encircling the axis of the shaft 180. The ends of the springs 302 may engage either side of the roller 280, as best seen in Figure 3, while the central portion of the springs 302 are retained within the recess 300 by a clamping element 304 which is secured to the boss 298 by a bolt 306. It may, therefore, be seen that as the steering wheel 18 is rotated by the vehicle operator, the bearing housing 284 will be caused to rotate above the axis of the shaft 180 and this in turn will cause either one side or the other of the springs 302 to deflect and to transmit a steering torque to the adaptor 272 through the extension 274 and the roller 280. The loose fitting splines at 296 will accommodate a slight amount of lost motion between the adaptor 272 and the steering wheel bearing housing to permit this spring deflection.

Referring more particularly to Figures 3 and 4, the adaptor 272 may be formed with a pair of flat surfaces 308 and 310 to which is secured a bracket 312 having transversely extending arms 314 and 316. Bolts 318 and 320 may be provided for this purpose. Bracket 312 may be received in a slot 322 formed in the upper side of the adaptor 272 to provide added support. Each of the arms 314 and 316 carries a "multiple contact" switch comprising a plurality of leaf springs 324 secured at the radially inward end thereof to the bracket 312 by clamping elements 326. The other ends of the leaf springs 324 may engage a tapered stop 328 carried by the remote end of the arm 316.

Each of the spokes 290 of the steering wheel carries a switch actuating member 330 which may be threadably carried by a bracket 332, the latter being bolted to the steering wheel spoke 290 by bolts 334 and 336. The arm 314 is similarly constructed with a multiple leaf switch and the adjacent steering wheel spoke may similarly be provided with a switch adjusting member 330 as indicated in Figure 4. Upon movement of the steering wheel in a clockwise direction, as viewed in Figure 3, the actuating member 330 will contact the multiple spring leaves 324 for the purpose of creating a contact between the ends of the spring leaves 324. Each of the spring leaves 324 is connected to a separate tap in a resistor situated within a housing 338. As the individual contacts of the switch are progressively closed, an increasingly large portion of the resistor becomes shorted so that the effective value of the resistance becomes progressively reduced. The resistance of the spring leaf conductors 324 form a portion of the electrical energizing circuit for the electromagnetic clutch member 118 and as the spring leaves 324 are urged into stacked engagement, the energizing current for the electromagnetic clutch member 118 increases. Similarly, the multiple leaf switch associated with the bracket arm 314 may be connected to spaced portions of another resistance contained in a second housing 340 as indicated in Figure 5, said spring leaves and resistances forming a part of the electrical energizing circuit for the electromagnetic clutch member 128. It may be seen that as the steering wheel 18 is rotated, the steering torque will be transferred to the adaptor 272 and the steering shaft 180 through the multiple leaf switches and through the bracket 312. As the steering effort increases, the deflection of the spring 302 will progressively increase and a greater number of the spring leaves associated with the multiple leaf switches will move into mutual engagement thereby decreasing the value of the effective resistance of the resistance elements contained in the housing 338 or 340 as the case may be. This will in turn cause a corresponding increase in the energizing current for the electromagnetic clutches, the magnitude of the current being proportional to the magnitude of the steering effort applied to the steering wheel 18.

It may be seen in Figures 5 and 6 that the bearings 286 and 288 may be retained in place on the shaft 180 by means of an adaptor 342 and a nut 344 threadably received on the end of the shaft 180. The outer race of the bearing 288 may be retained in place by an externally threaded retainer 346 received within the hollow interior of the bearing housing 284. A horn button is generally shown in Figure 5 at 348 and is provided with a web 350 which may be carried by a stud 352 retained on the bearing housing 284 by bolts 354. The horn button 348 is adapted to be pressed to cause contact between the spring loaded contact members, one of which is shown in Figure 5 at 356, said contact members forming a portion of the horn circuit.

During operation of the steering mechanism, the dirigible vehicle wheels may be turned by applying a manual steering effort to the steering shaft 180 which imparts a rotary motion to the worm gear 182 and an oscillatory motion to the sector gear and pitman arm. The vehicle engine power is continuously transmitted to the power input shaft 22 through the pulley drive comprising the pulley 64, the belt 62, the pulley 58 and the shaft 24. The power input shaft 22 delivers power through the one-way clutch mechanism shown at 102, 110, and 112 to the adaptor 108 and the electromagnetic clutch member 118. Power is simultaneously delivered to the electromagnetic clutch member 128 through the cylindrical shell 126.

If it is assumed, for example, that the steering wheel is rotated in a clockwise direction as viewed in Figure 3, the multiple spring leaves 324 will progressively cut out or by-pass portions of the resistance within the housing 338 to decrease the total effective resistance in the circuit for the electromagnetic clutch core 122. When the core 122 becomes energized, the stator 140 becomes clutched to the friction disc 124 and the driving torque imparted to the electromagnetic clutch element 118 is transferred to the stator 140, to the shaft 144 and to the pinion 158. The engine power is then delivered through the idler pinion, not shown, through the gear 178, sleeve 172, and the pinion 170 to the worm gear 182, the direction of the torque so applied to the worm gear 182 being in a direction which will supplement the manual torque applied thereto by the vehicle operator. It will thus be apparent that the magnitude of the power assist obtained from the engine will be proportional to the magnitude of the steering effort applied to the steering wheel and to the vehicle steering requirements.

Upon movement of the steering wheel in the opposite direction, the electromagnetic clutch core 130 will become progressively energized depending upon the magnitude of the applied torque while the electromagnetic clutch core 122 becomes deenergized. When the core 130 becomes so energized, the stator 150 becomes clutched to the friction disc 132 to permit the transfer of engine power to the sleeve shaft 152 and the pinion 156. Power is then delivered to the worm gear 182 through the gear 160, the shaft 162, and the pinion 168, the torque applied to the worm gear 182 being in a direction opposite from that applied by the pinion 170.

The pinions 168 and 170 together define a split beveled pinion and they rotate together and simultaneously engage the same beveled gear tooth on the worm gear 182. However, when power is being delivered through a first one of the beveled pinions to the worm gear 182, the other beveled pinion will be urged in a direction opposite to its direction of rotation by reason of the residual drag between the deenergized electromagnetic clutch member and its associated stator member. Similarly, when power is being delivered through the other beveled pinion, the first beveled pinion will be urged in a direction opposite to its direction of rotation by reason of the drag present in its associated power delivery path. It is thus apparent that all backlash between the split pinion shown at 168 and 170 and the worm gear 182 will be eliminated thereby decreasing the amount of undesirable free play in the steering mechanism.

It will be observed that engine power is continuously applied to the electromagnetic clutch members to rotate the latter continuously in the same direction. However, if the engine should for some reason become stalled, the dirigible wheels may be controlled manually through the geared connection between the worm gear 182 and the sector gear 204. In this instance, the shaft 144 and the sleeve shaft 152 will be rotated by reason of the geared connection between the same and the worm gear 182. Since the multiple leaf switches on the steering wheel will be continuously actuated during manual steering of the vehicle, either one or the other of the electromagnetic clutch members 118 or 128 will be energized. Therefore, the torque applied to the shaft 144 and sleeve shaft 152 will be transferred to the adaptor 108 through the clutches 118 and 128. However, the one-way clutch spring 112 will become loosened from the cylindrical shaft portion 102 and the cylindrical surface on the adaptor 108 to permit an overriding of the adaptor 108 with respect to the shaft 122, thereby making it unnecessary for the vehicle operator to overcome the resistance to rotation offered by the driveshaft 22, the shaft 24, the pulley drive, and the stalled engine crankshaft.

Figure 7:
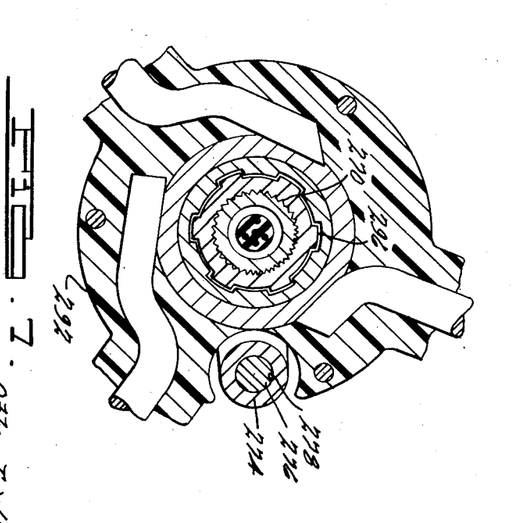
Figure 7 is a cross sectional view of the hub section of the steering wheel structure and is taken along section line 7—7 of Figure 6.
Figure 8:
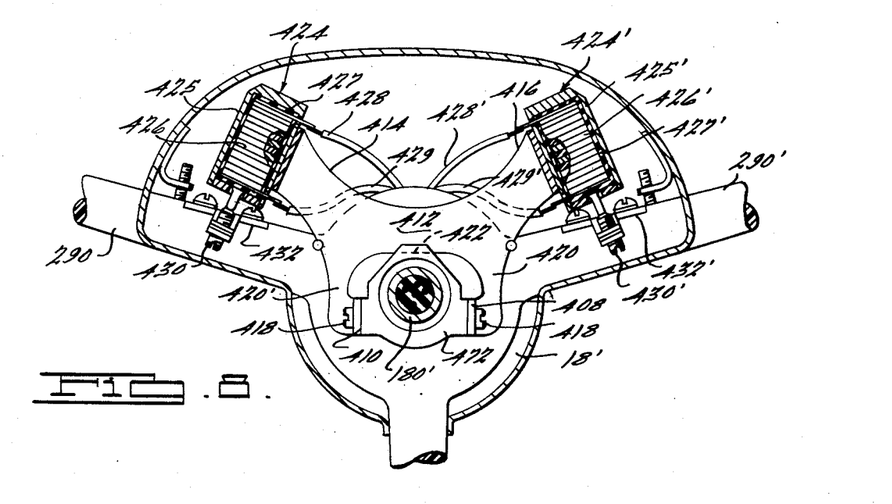
Figure 8 is a bottom view of a modified form of electromagnetic clutch control and it generally corresponds to the control illustrated in Figure 4.

Referring next to Figure 8, I have illustrated an electromagnetic clutch control mechanism of modified construction and it comprises an adaptor 472 which may be splined to the upper end of the steering shaft designated by numeral 180'. The adaptor 472 may be formed with a pair of flat surfaces 408 and 410 and a bracket 412 may be fastened to the flat surfaces 410 and 408 by means of bolts 418, said bracket 412 being provided with finger-like extensions 420 and 420' for accommodating the connection with the flat surfaces 408 and 410 respectively. The bracket 412 may be received in a slot 422 formed in the upper side of the adaptor 472 to provide added support. It will be understood that the steering wheel, designated generally by numeral 18', may be rotatably journalled on the upper end of the steering shaft 180' in a manner similar to that which was previously described in connection with the construction of Figures 1 through 7.

A bracket 412 includes a pair of upwardly extending arms 414 and 416 and carbon pile control elements are carried by the extremities of the arms 416 and 414, said carbon piles being designated by numerals 424 and 424'. The carbon pile 424 comprises a casing 425 and a plurality of stacked carbon elements 426 situated within the housing 425 and insulated therefrom by suitable insulating material 427. A conductor 428 is connected to one end of the stacked carbon elements 426 and another conductor 429 is similarly connected to the opposite end, said conductors 428 and 429 extending through the steering shaft 180' to one of the electromagnetic clutch elements. The conductors 428 and 429 together with the stacked carbon elements 426 are connected in series with the associated electromagnetic clutch and form a portion of the clutch energizing circuit. Similarly, the carbon pile 424' includes a casing 425', carbon elements 426' and insulating material 427' together with conductors 428' and 429'. The conductors 428' and 429' extend to the other of the electromagnetic clutch elements and are series connected therewith to form a portion of the clutch energizing circuit.

The steering wheel 18' includes spokes 290 and 290' which carry bracket elements 432 and 432' respectively, each of said bracket elements being secured to their associated steering wheel spoke by suitable screws or other fastening means as indicated. The bracket elements 432 and 432' are adapted to carry a threaded adjusting element 430 and 430' respectively, and they are adapted to engage their associated carbon pile control elements by means of an interlinking member extending from the interior of each of the carbon pile casings 425 and 425'.

As the steering wheel 18' is rotated in a clockwise direction as viewed in Figure 8, the steering effort will be transmitted to the bracket 412 through the carbon pile control element 424 thereby compressing the carbon elements 426. This reduces the effective electrical resistance offered by the carbon elements 426 thereby causing a reduction in the overall resistance for the electromagnetic circuit for the associated electromagnetic clutch core. I contemplate that the effective resistance for the electromagnetic clutch will vary linearly with the applied steering effort since the entire steering torque is transmitted through the carbon pile control element.

Upon rotation of the steering wheel in the counterclockwise direction, as viewed in Figure 8, the carbon elements 426' of the carbon pile control element 424' will become compressed thereby causing the effective resistance in the other electromagnetic element to become reduced. Since the magnitude of the power assist obtained from the engine will be dependent upon the clutching effort of the electromagnetic elements and since the clutching effort is proportional to the magnitude of the energizing current, it is thus seen that the magnitude of the power assist is linearly proportional to the magnitude of the steering effort applied to the steering wheel. This feature provides an inherent feel-back and a normal steering sensation during operation. Further, this normal steering sensation is not accompanied by a time lag between the steering movement and the application of the proper assist. The carbon pile control elements are instantaneously responsive to steering effort to provide appropriate variations in the clutch energizing current and little or not relative movement between the steering wheel and the steering shaft is experienced.

By preference the connection between the steering wheel hub and the adaptor 472 may include a loose splined connection similar to that shown in Figure 7 although it will be understood that turning effort will be transmitted through the splined connection only in the event that one of the carbon pile elements becomes damaged or otherwise incapable of transmitting a manual steering effort to the steering shaft.

Although I have disclosed certain preferred embodiments of my instant invention, I contemplate that other variations may be made without departing from the scope of my invention as defined by the following claims.

I claim:

1. In a power steering device for an engine powered vehicle having dirigible wheels, a steering mechanism for imparting a steering motion to said wheels, a manually operable steering member having a gear portion thereon, a driven member having a gear portion meshed with the gear portion of said steering member, a power driven shaft, a first and a second gear meshed with the gear portion of said manually operable member, a pair of intermediate geared power flow paths each having a portion thereof connected to a separate one of said gears, and clutch means for selectively clutching said shaft to portions of each of said geared power flow paths, one of said paths being adapted to drive one of said gears in one direction and the other of said paths being adatped to drive the other gear in the opposite direction.

2. In a power steering device for an engine powered wheeled vehicle having a vehicle steering mechanism, a manually operable steering member, a driven member geared to said steering member and forming a portion of said steering mechanism, a power driven shaft, an adaptor situated in aligned relationship with respect to said shaft, geared power flow means connected with said manually operable member, and a separate clutch means associated with each power flow means for clutching the latter with said adaptor, and one-way clutch means for coupling said shaft to said adaptor for accommodating the transfer of torque from the former to the latter in one direction only.

3. In a power steering mechanism, a manually operable steering member, a driven member operatively engaged with said steering member, a pair of concentrically mounted power delivery shafts, separate gears carried by each of said shafts, a pair of pinions engaged with one of said members, a geared connection between each of said separate gears and separate ones of said pair of pinions, a power driven element, and clutch means for selectively clutching said power driven element to one and to the other of said shafts.

4. The combination as set forth in claim 3 wherein one of said geared connections is adapted to deliver torque to one of said pinions in one direction and the other geared connection is adapted to deliver torque to the other of said pinions in the opposite direction.

5. In a power steering mechanism, a steering shaft member, a driven member operatively connected with said steering member, a first engine driven clutch portion, two geared power delivery means each having a portion drivably engaged with one of said members, a second and a third clutch portion carried by each of said power delivery means respectively, said first clutch portion including first and second electromagnetic elements, a manually operable steering control member, separate electrical circuits for energizing each of said electromagnetic elements to effect a driving engagement between said first and second clutch portions and between said first and third clutch portions respectively, each of said circuits including an electrical resistance element, and a switching means forming a portion of said circuits for varying the effective electrical resistance of said resistance element, said switching means having portions carried by said manually operable control member and by said steering shaft respectively, one portion of said switching means engaging the other upon movement of said control member to actuate the switching means to progressively vary the effective resistance in one of the electromagnetic clutch circuits in response to manual steering torque.

6. In a power steering mechanism, a steering shaft member, a driven member operatively connected with said steering shaft member, a first engine driven clutch portion, two geared power delivery means each drivably engaged with one of said members, a second and a third clutch portion carried by each of said power delivery means respectively, said first clutch portion including first and second electromagnetic elements, a manually operable steering control member, and separate electrical circuits for energizing each of said electromagnetic elements to effect a driving engagement between said first and second clutch portions and between said first and third clutch portions respectively, each of said circuits including an electrical resistance element, switching means having portions carried by said steering shaft member and by said manually operable control member respectively for varying the magnitude of the electrical resistance of said resistance element, each of said switching means being actuated upon relative movement of said control member with respect to said steering shaft member.

7. In a power steering mechanism, a steering shaft member, a driven member operatively connected with said steering shaft member, an engine driven power delivery shaft, two geared power delivery means each drivably engaged with one of said members, electromagnetic clutch means for drivably connecting said power delivery shaft selectively with either of said geared means, separate electrical circuits for energizing each of said clutch means to effect the driving connection between said power delivery shaft and the selected geared means, a manually operable steering control member journalled on said steering shaft member, each of said circuits including a variable electrical element therein, control means having portions thereof carried by said manually operable steering control member and by said steering shaft member for varying the magnitude of the electrical potential of said electrical element, and a lost motion connection between said manually operable control member and said steering shaft member to provide manual control of said steering mechanism when said electromagnetic clutch means becomes inoperative.

8. In a power steering mechanism, a steering shaft member, a driven member operatively connected with said steering shaft member, an engine driven power delivery shaft, two geared power delivery paths each drivably engaged with one of said members, separate electromagnetic clutch means associated with one of each of said power delivery paths respectively for selectively clutching together the associated geared path and said power delivery shaft, separate electrical circuits for energizing each of said clutch means to effect a driving connection between said power delivery shaft and said driven member, a manually operable steering control member, each of said circuits including a variable electrical control means having portions thereof carried by said manually operable steering control member and by said steering shaft member for varying the magnitude of the electrical energy in each of said circuits.

9. In a power boosting mechanism, a driving member, a driven member, a driving connection between said driving and driven members, a pair of separate gears operatively engaged with one of said members, a power operated element, a pair of separate power delivery shafts, first and second power transmission means operatively connecting one of each of said gears with one of each of said shafts, clutch means for selectively clutching said power operated element with said first and second power transmission means, and means for selectively operating said clutch means responsive to operation of said driving member.

10. In a power steering device for an engine powered wheeled vehicle having a wheel steering mechanism, a manually operable steering member, a driven member connected to said steering member, one of said members including a gear portion, a power driven element, a first and a second power gear train each including separate gears meshed with the gear portion of said one member, separate clutch means for selectively clutching said element to a portion of either gear train, and control means for selectively energizing said separate clutch means, one of said separate gears being subjected to a driving torque in one direction and the other of said separate gears being subjected to a driving torque in the opposite direction when its respective clutch is energized.

11. In a power steering mechanism a manually operable steering member, a driven member operatively engaged with said steering member, two separate power delivery means drivably engaged with one of said members, an engine driven shaft, an adaptor, a one-way clutch means for accommodating the transfer of power from said engine driven shaft to said adaptor in one way only, and clutch means for selectively clutching said adaptor with either of said power delivery means.

References Cited in the file of this patent

UNITED STATES PATENTS

| 1,685,440 | Tanner | Sept. 25, 1928 |
| 2,311,010 | Sickens | Feb. 16, 1943 |
| 2,446,393 | Russell | Aug. 3, 1948 |
| 2,587,377 | Penrose | Feb. 26, 1952 |
| 2,691,308 | Lincoln et al. | Oct. 12, 1954 |
| 2,744,415 | Gaubatz | May 8, 1956 |
| 2,775,133 | Armantrout | Dec. 25, 1956 |

FOREIGN PATENTS

| 204,928 | Australia | Mar. 31, 1955 |